(12) United States Patent
Bryant

(10) Patent No.: US 7,230,970 B1
(45) Date of Patent: Jun. 12, 2007

(54) APPARATUS AND METHOD FOR LOCATING NONLINEAR IMPAIRMENTS IN A COMMUNICATION CHANNEL BY USE OF NONLINEAR TIME DOMAIN REFLECTOMETRY

(75) Inventor: Paul Henry Bryant, Encinitas, CA (US)

(73) Assignee: Chaos Telecom, Inc., San Diego, CA (US)

(*) Notice: Subject to any disclaimer, the term of this patent is extended or adjusted under 35 U.S.C. 154(b) by 872 days.

(21) Appl. No.: 10/612,175

(22) Filed: Jul. 2, 2003

Related U.S. Application Data

(60) Provisional application No. 60/424,499, filed on Nov. 6, 2002.

(51) Int. Cl.
*H04B 1/69* (2006.01)
*H04M 1/24* (2006.01)

(52) U.S. Cl. .................... 375/130; 379/1.01
(58) Field of Classification Search ............ 375/130, 375/222, 254, 224, 227, 228; 379/1.01, 1.02, 379/27.01, 27.04; 370/252
See application file for complete search history.

(56) References Cited

U.S. PATENT DOCUMENTS

| | | | |
|---|---|---|---|
| 6,272,209 B1 | 8/2001 | Bridger et al. ............ 379/27 |
| 6,275,050 B1 | 8/2001 | Born et al. ............... 324/700 |
| 6,519,253 B1 | 2/2003 | Posthuma ................ 370/359 |
| 7,020,246 B2 * | 3/2006 | Gao et al. ................ 379/1.01 |
| 7,050,548 B2 * | 5/2006 | Bostoen et al. .......... 379/27.01 |

OTHER PUBLICATIONS

United States Department of Agriculture Bulletin 1751H-501, Fundamentals of ISDN, pp. 1-26 Conference Paper Proceedings of the 34th Meeting of IEEE Holm Conference on Electrical Contacts, 1988, IEEE Cat. No. 88CH2604-7, The Effects of Current on Stationary Contact Behavior, W.W. Bennett, pp. 267-276.

(Continued)

*Primary Examiner*—Khai Tran
(74) *Attorney, Agent, or Firm*—INCAPLAW; Terrance A. Meador

(57) ABSTRACT

A series of time domain reflectometry (tdr) measurements are made on a channel having nonlinear impairments as well as linear impairments. In a given measurement, the reflected signals from the impairments are digitized and sequentially stored in memory. The parameters characterizing the channel are then changed, preferably by biasing the line by means of a dc current. The changed bias condition modifies the impedance of nonlinear impairments in a nonlinear manner, while the impedance of linear impairments are unchanged by the bias. A second tdr measurement is initiated, and the reflected signals digitized and sequentially stored. The two sets of stored reflected signals are then sequentially compared, and corresponding signals having either the same amplitudes or linearly proportional amplitudes are identified as reflected from linear impairments, while those not the same, nor proportional, are identified as from nonlinear impairments.

38 Claims, 13 Drawing Sheets

OTHER PUBLICATIONS

Physical Review B, vol. 43, No. 2, Jan. 15, 1991-I, Degradation and Regeneration of Copper Electrical Junctions, pp. 1433-1440 Conference Paper INTELEC, Tenth Int'l Telecommunications Energy Conference, 1988, IEEE Cat. No. 88CH2653-4, Sealing Current and Its Impact on ISDN Powering Requirements, Frantz and Taylor, pp. 151-155.

Splice-Induced Impairments on Very-High-Speed Digital Data Communications Over Coper Telephone Networks, K. Sistanizadeh, pp. 3-15, UCLAScience & Engineering Library Analysis of the Noice Environment in Fugure Twisted-Pair Access Technologies, Magesacher, Haar, and Zukunft, Institute for Integrated Circuits—Bridgelab, Munich, Germany, pp. 1-5.

Standard for ISDN-Basic Access Interface for Application on the Network Side of the NT, Layer 1 Specification, Sealing Current Provisioning, S.G. Ungar, TIE1.4 Technical Subcommittee Working Group Members, pp. 1-26.

* cited by examiner

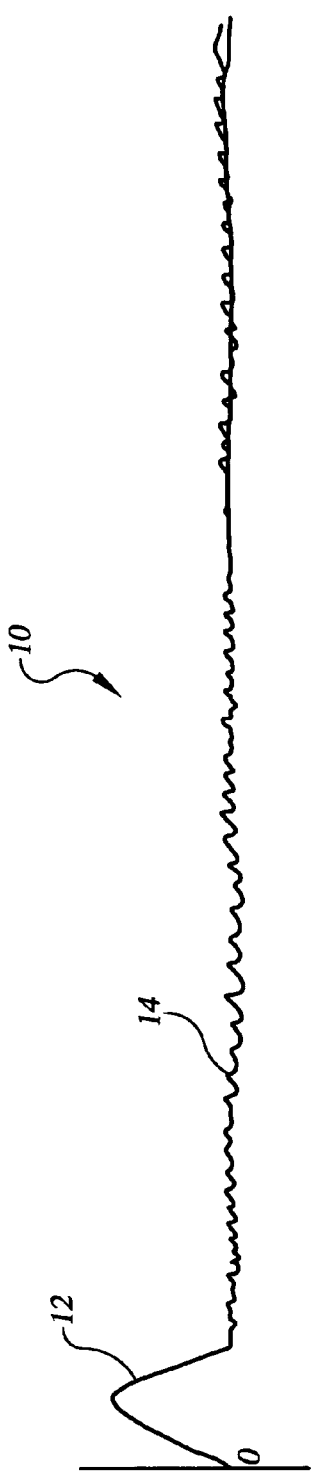
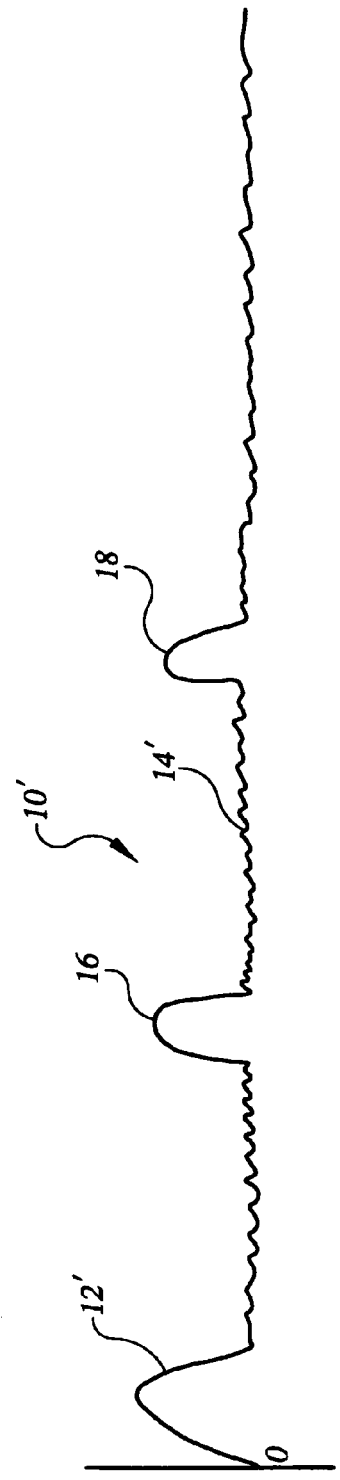
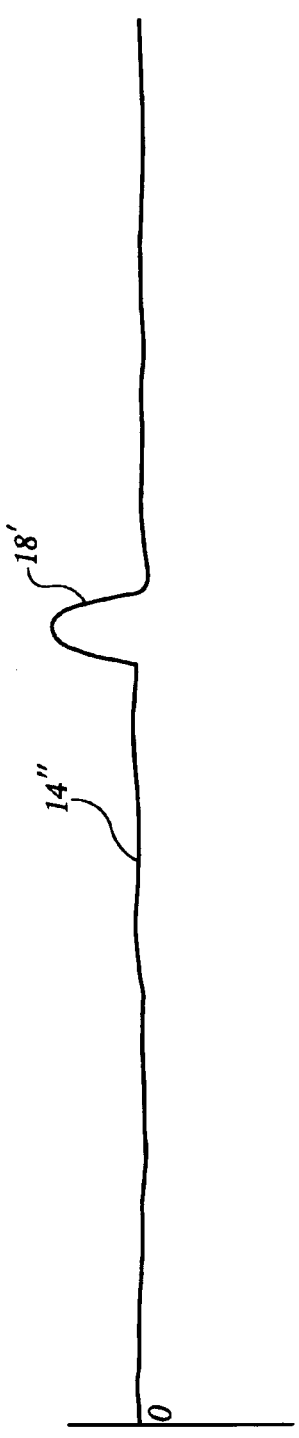
FIG.1 *PRIOR ART*
FIG.2 *PRIOR ART*
FIG.3

APPARATUS AND METHOD FOR LOCATING NONLINEAR IMPAIRMENTS IN A COMMUNICATION CHANNEL BY USE OF NONLINEAR TIME DOMAIN REFLECTOMETRY

CROSS REFERENCE TO RELATED APPLICATIONS

This application claims the benefit of U.S. Provisional Application Ser. No. 60/424,499, filed Nov. 6, 2002.

This application contains subject matter that is related to the subject matter of the following copending applications, both of which are incorporated herein by reference: U.S. patent application Ser. No. 09/968,063 filed Oct. 1, 2001 for "A Multistage Equalizer that Corrects for Linear and Nonlinear Distortion in a Digitally-Modulated Signal"; and U.S. Provisional Application 60/422,655 filed Oct. 30, 2002 for "A Multistage Nonlinear Echo Canceller for Digital Communication Systems". Related subject matter is also found in U.S. patent application Ser. No. 10/456,270 filed Jun. 6, 2003 for "A Multistage Nonlinear Echo Canceller for Digital Communication Systems With or Without Frequency Division Multiplexing", which claims priority to the '655 application.

BACKGROUND OF THE INVENTION

This invention relates to a data communication channel and in particular to locating and identifying conditions, including nonlinear impairments, affecting the transmission characteristics of the channel. This invention could potentially also relate to any linear medium that supports wave propagation and can contain sites where nonlinear impairments affect transmission.

The rapid expansion of the Internet has resulted in an increased demand for a global high-speed data network for communication between Internet subscribers and ISPs. In response to the demand, the worldwide telephone network and the cable television network have been adapted to provide this service. While much of the telephone network has been adapted to support advanced digital communications between central offices, the link from a central office to the premises of a local subscriber is still predominantly the twisted pair copper loop (also called a "subscriber loop"). At present, there are in place many miles of twisted pair copper subscriber loops that were originally designed to carry low frequency analog voltage voice signals. To meet the Internet requirement of transferring packetized digital information, new encoding and modulation methods have evolved to carry higher digital data rate transmissions over these low frequency telephone network loops. For example, Digital Subscriber Line systems (DSL), share in common accepting digital inputs from a subscriber's or an ISP's computer, converting it to a complex analog signal for high speed transmission over the telephone network, and reconverting it to Internet compatible digital information at the receiving site. Successful high-speed transmission of digital information relies on maximum utilization of the capabilities of the transmission channel, and this requires matching the DSL system requirements to the existing telephone channel characteristics.

Cable television channels have also being adapted for the transmission of data, and may exhibit problems similar to those experienced in data transmission over the telephone network. These transmissions primarily occur on coaxial cables consisting of an inner conducting wire surrounded by a conducting shield.

The channels used for transmission of DSL signals are conventionally configured, with channel output being a linear function of channel input, so that even if signals are subject to linear distortion they can be recovered using straightforward equalization techniques. However, a channel that is otherwise entirely linear may be subject to nonlinear effects that occur at one or more discrete locations in the channel. For example, a line driver at the channel input may exhibit some nonlinear distortion, an imperfect contact or splice in the channel may have nonlinear characteristics, or a transformer in the channel may exhibit a significant nonlinearity related to magnetic hysteresis and saturation in the core. These nonlinearities give rise to intermodulation components that become dispersed in time as the signals traverse the channel due to the phase shift of the linear portion of the channel. At the receiving end of the channel these components arrive intermixed relative to each other, and cannot be compensated for or corrected by the linear equalizers known in the art.

Channel equalization for compensation of signal distortion produced both linear and nonlinear impairments is accordingly a priority requirement for efficient, effective DSL operation over a telephone or cable network. U.S. application Ser. No. 09/968,063 filed Oct. 1, 2001 in the name of Bryant, discloses a method and apparatus for correction of both linear and nonlinear distortion. U.S. Application 60/422,655 filed Oct. 30, 2002 in the name of Bryant discloses a method and apparatus for echo cancellation in lines having nonlinear impairments. Both of these applications are hereby incorporated by reference.

It is known in the art that time domain reflectometry (TDR) can detect the presence and indicate location of irregularities in a channel by measurement of the return time of pulses reflected from line impairments. However, the method does not distinguish between linear and nonlinear irregularities. U.S. Pat. No. 6,275,050 discloses detection of nonlinear effects caused by corrosion in metal junctions by the measurement of harmonics and intermodulation products generated in signals which have passed through corroded metal junctions.

Referring to FIG. 1, a TDR readout trace 10, as practiced in prior art, shows a main pulse 12 and noise pulses, e.g. 14, derived from the voltages present on a communication channel having no impairments. The main pulse 12 is connected or coupled to a transmission channel being tested. The channel may include one or more linear or nonlinear impairments which cause reflections of the main pulse 12. These reflections (also "echoes") travel through the channel against the direction in which the pulse 12 travels, arriving back at the point or location at which the pulse was introduced into the channel. For example, in FIG. 2, the main pulse 12' results in a reflection or echo 16 from a linear impairment, and a reflection or echo 18 from a nonlinear impairment, as well as noise signals 14'. (In the drawings, equivalent elements are identified with the same reference numbers, albeit they are distinguished by primes.) It will be noted that the echo 16 from the linear impairment, and the echo 18 from the nonlinear impairment both appear on the trace 10', and are not distinguishable. The traces 10 and 10' display the main pulse, the noise and reflected signals, in a manner known in the art. It will be noted that, in practice, the echo pulses, e.g. 16, 18 will often be much smaller in height that the main pulse 12'.

This invention may be embodied in a method or an apparatus for detecting the presence and locations of linear and nonlinear impairments in a transmission channel, and for differentiating the nonlinear impairments from the linear ones. Preferably, the effects produced in echoes from one or more nonlinear impairments are distinguished from and cancel the effects produced in echoes from one or more linear impairments so as to reveal the presence and locations of any nonlinear impairment. I call this invention nonlinear time domain reflectometry (NTDR).

SUMMARY OF THE INVENTION

A sequence of one or more electromagnetic pulses is applied to the input of a transmission channel in a manner similar to a conventional time domain reflectivity measurement. The pulses are of equal amplitudes and pulse widths, and are generated at a selected repetition rate. The time interval from any one of these pulses to the next is a "sweep". Echoes are produced by reflection of pulses from both linear and nonlinear line impairments, with the echoes occurring in a sweep at times proportional to the impairments' distances from the input point. The pulse repetition rate is chosen to be low enough that all the reflected pulses from a given transmitted pulse will have been received in a sweep before the next pulse is transmitted.

In accordance with the teachings of the invention, beginning at the time origin, i.e., the rising edge of a transmitted pulse, the voltages on the line are digitized at a sampling rate to capture characteristics of echoes produced in response to the transmitted pulse, and the digital values of the line voltage at each sampling time are stored in individual memory locations. Sampling continues through the entire time interval each sweep between transmitted pulses, and for every transmitted pulse the running average of each set of correspondingly timed digital samples is computed and sequentially stored in memory locations. This leaves the average value of each repetitively received echo unchanged, while the average values of the randomly phased line noise samples tend towards zero, with an attendant increase of signal to noise ratio. This is of particular advantage in that the echo pulses, e.g. 16 and 18 are often much lower in amplitude than the main pulse, 12', as mentioned above. One useful result of a running average is the conservation of memory requirements. But it should also be evident that keeping a running average is equivalent to capturing data continuously for the entire series of transmitted pulses and then performing the averaging process afterwards by dividing this large data set into sections—one section for each transmitted pulse.

A method enabling the practice of the invention teaches differentiating between a linear impairment and a nonlinear one by recognizing that echoes returned from linear impairments are linearly related to the amplitude of the applied pulse. A linear impairment presents constant impedance independent of the excitation amplitude or location of the operating point. This constant impedance results in the response being directly proportional to the pulse amplitude. The constant impedance of a linear impairment also causes the response to be independent of the biased location of the operating point along the voltage vs. current characteristic of the impairment, for a constant amplitude pulse. On the other hand, a nonlinear impairment has a nonlinear voltage vs. current characteristic, and accordingly its impedance varies markedly depending upon where the operating point is located. Thus, reflections or echoes from a nonlinear impairment are neither proportional to pulse amplitude, nor, for constant amplitude pulses, independent of the operating point location. By controlling these parameters, and by comparing echoes from two runs for varied parameters, practice of the invention allows distinguishing linear from nonlinear impairments, as will be disclosed in the description of the invention set forth below.

In one embodiment of the invention, after a first run in which a preset number of transmit pulses cycles are coupled to a transmission channel under test, the amplitudes of the transmitted pulses are increased by a fixed factor, for example, by a factor of 2, and the entire process repeated for a second run. In this second run, identical routines for sampling, and then separately storing the digitized line voltages in a corresponding set of memory locations, are performed. The stored data values from the lower pulse amplitude run are then multiplied by the same fixed factor used to increase the amplitude of the transmitted pulses, and the products are retained, sample by sample, in storage. The two sets of final stored values are then subtracted from each other after the second run's data is multiplied by the fixed factor from the data value in the corresponding memory location of the stored first run's data.

For a linear line impairment the resultant echo amplitude is linearly related to the amplitude of the incident transmitted pulse, so the data from the lower amplitude run, when multiplied by the fixed factor, will increase by exactly the magnitude of the multiplying factor. Therefore, in the second run a linear impairment echo will scale to the same amplitude as the echo this linear impairment exhibited during the higher pulse amplitude run. On the other hand, the echo from a nonlinear impairment during the higher pulse amplitude run will not be linearly related to the amplitude of the transmitted pulse. Due to the curvature of the voltage/current characteristic of the nonlinearity, the impedance of the impairment is a nonlinear function of the transmitted pulse amplitude, and the amplitude of echo from the impairment is distorted relative to the transmitted pulse amplitude. Accordingly, the amplitudes of echoes from the same nonlinear impairment do not scale in the ratio of the fixed multiplication factor from the first run to the second.

Upon subtraction of the data from the two runs, a residual response is produced and the linearly generated echoes will cancel, while an echo from a nonlinear impairment will be apparent as the finite difference between the data values stored in memory. Lack of any effects produced by nonlinear impairments will result in a featureless residual response even during the time when the main pulse is being transmitted. If the residual response departs significantly from zero, it indicates the presence of a nonlinear impairment. The sample number for which a departure first occurs can be used to calculate the distance to the nonlinear impairment. FIG. 3 shows the residual response which corresponds to the conventional TDR result shown in FIG. 2. Note that only the pulse 18' is visible which corresponds to a nonlinear impairment in the line. The transmitted pulse 12 and echo 16 from a linear impairment do not have corresponding features in FIG. 3.

FIG. 4 illustrates experimental data demonstrating the effectiveness of the invention in detecting a nonlinear impairment. In this figure, the trace 128 shows the residual response for a line having no impairments, the trace 130 shows the result for the same line having a linear impairment located 3000 feet downline, and the trace 132 shows the result for the same line having instead a nonlinear impairment at the same location. Note that the residual pulse can be positive or negative depending on the nature of the nonlinearity at the impairment site.

In another embodiment of the invention, the transmitted pulse amplitude remains constant but the operating point is displaced by a bias current applied to the impairment by way of the transmission channel under test. Data is acquired from two runs, the runs differing in that either the bias current is changed or the pulse amplitude polarity is reversed from the first to the second run, so that the operating point and accordingly the impedance from a nonlinear impairment changes, while the impedance of a linear impairment is unchanged. The two data runs are processed as outlined above, so that the averaged linear echoes cancel out, while the nonlinear echoes are displayed. By keeping the pulse amplitude constant this method has the advantage of canceling out any distortion that is inherent in the pulse generation or in the recovery of the echo signal. This embodiment is particularly practical for telephone lines at the customer end where telephone line voltage can be utilized to generate the desired bias current.

The invention will be described with reference to the below-described drawings, in which:

BRIEF DESCRIPTION OF THE DRAWING

FIG. 1 is a graph of a time domain reflection display with no line impairments, as known in the art;

FIG. 2 is a graph of a time domain reflection display with line impairments present, as known in the art, FIG. 3 is a graph of a time domain reflection display illustrating operation of the invention.

DETAILED DESCRIPTION OF THE PREFERRED EMBODIMENTS

Figure 5:
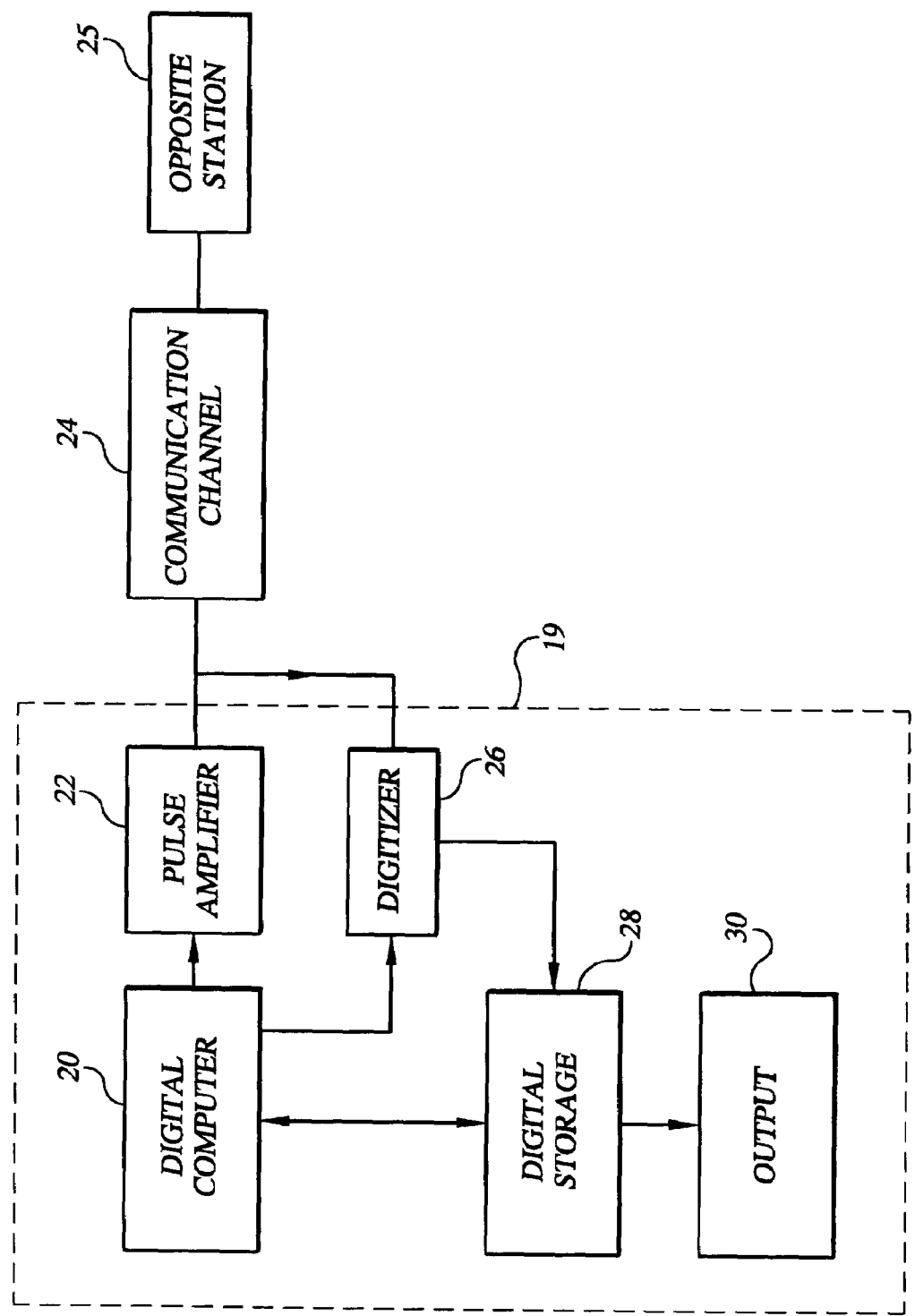
FIG. 5 is a block diagram of an apparatus according to one embodiment of the invention.

In an embodiment of the invention shown in FIG. 5, a digital computer 20 outputs a pulse of programmable amplitude and repetition rate to a pulse amplifier 22. (The apparatus of the invention may be packaged as a unit to serve as a portable test instrument, 19, or incorporated into the design of a broadband modem). The pulse amplifier 22 drives a communication channel 24 being swept for the presence of impairments. The communication channel 24 typically has a transmission line including two conductors (e.g., a twisted pair for telephone, a coaxial cable for television), and the pulse amplifier 22 applies a voltage pulse between the two conductors. Coincident with the pulse from pulse amplifier 22, a digitizer 26 begins digitizing the voltage present on the channel 24, and the computer 20 stores the digitized value of each sample in digital storage unit 28. On the next pulse from pulse amplifier 22, the sweep is repeated and the new digitized values are similarly stored. Because the digitizing rate is constant, all storage cells with data from correspondingly timed samples of later occurring sweeps are retrievable by addressing the sample number of the data for the sweep.

Figure 6:
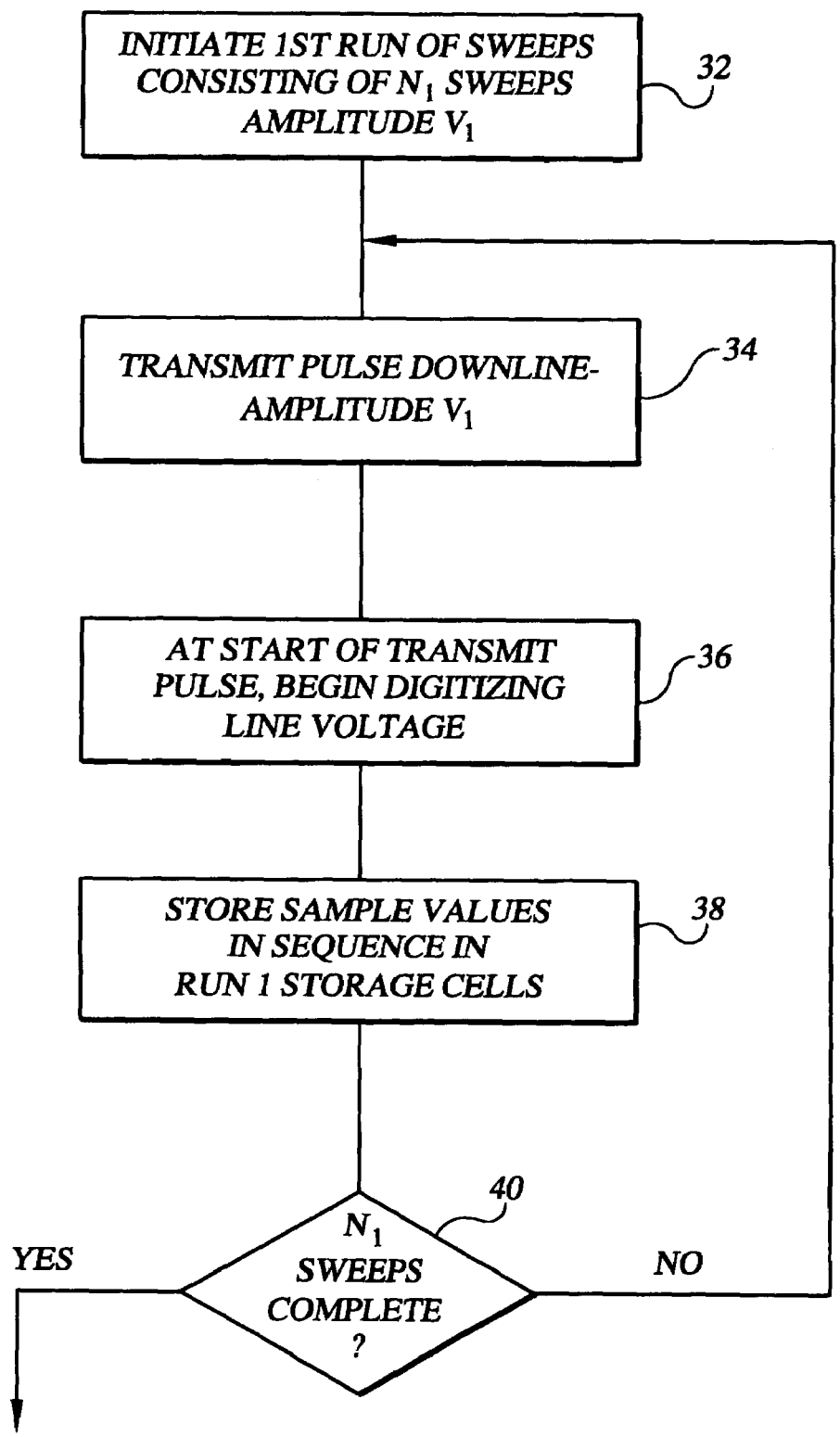
FIGS. 6, 8, and 9 are flow diagrams of steps illustrating practice of another embodiment of the invention.
Figure 8:
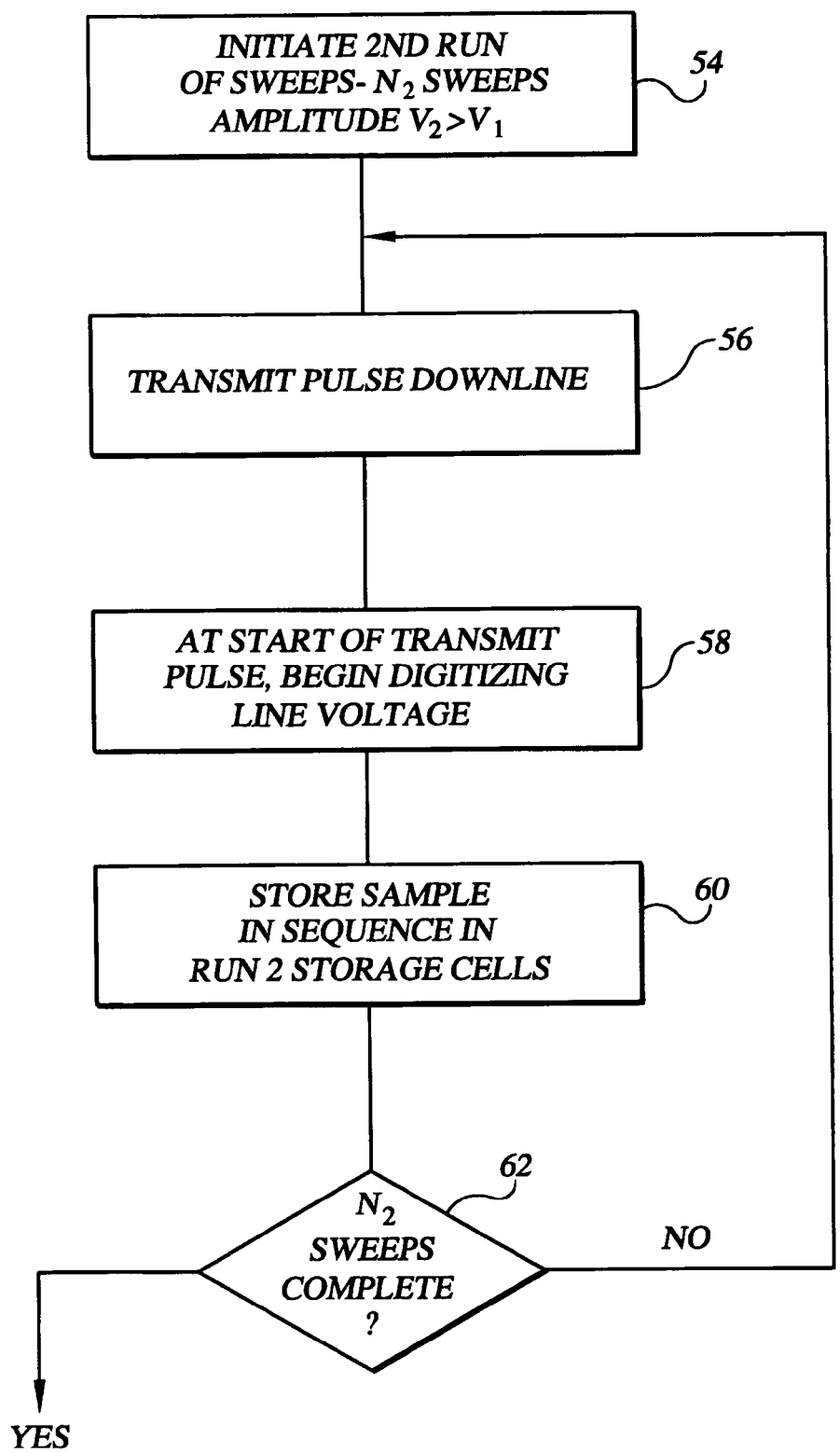
Figure 9:
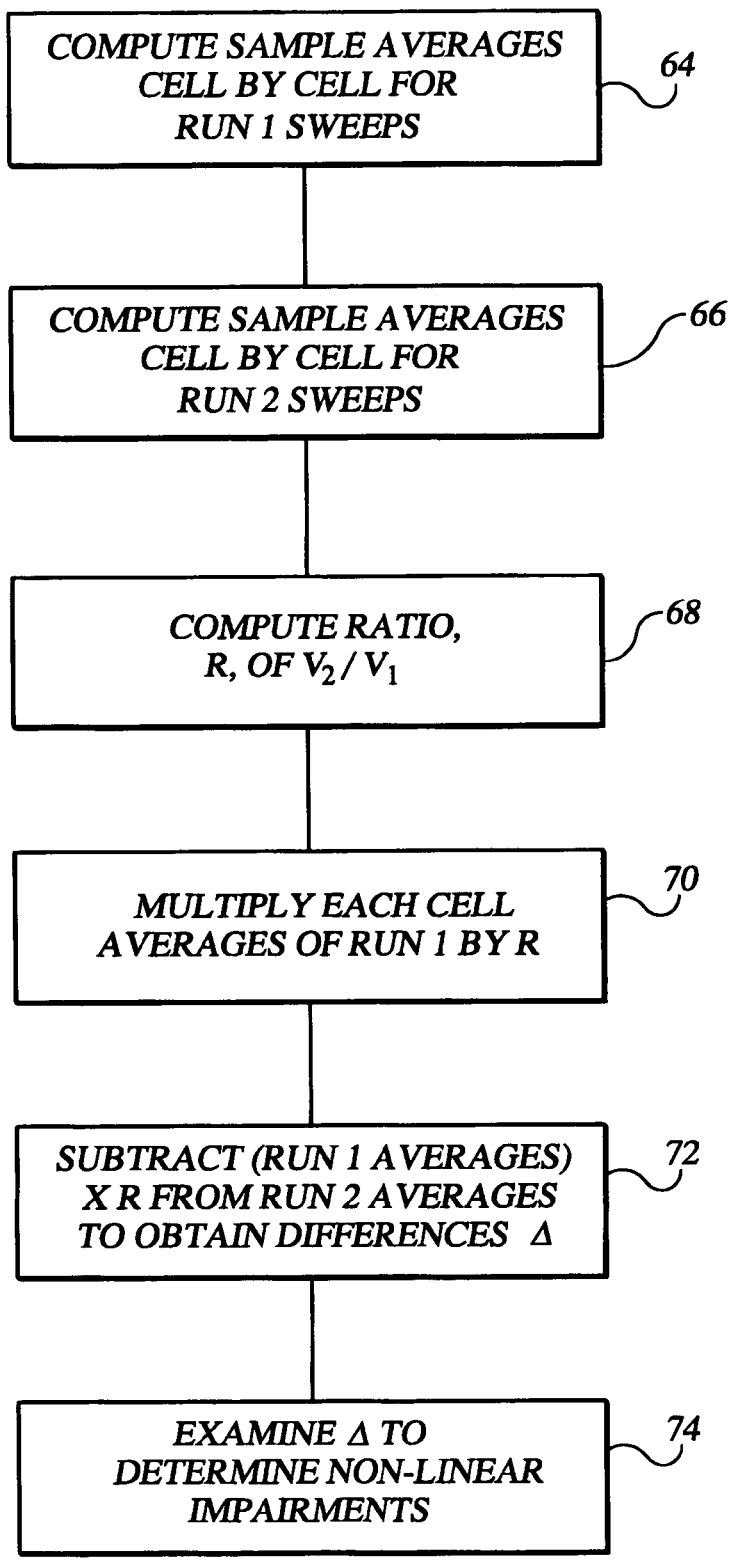

FIGS. 6, 8, and 9 set forth a method embodiment of the invention which is illustrated by operation of the apparatus shown in FIG. 5. In this regard, the digital computer 20 initiates at 32 a first run of sweeps consisting of $N_1$ sweeps with pulse amplitude $V_1$, and at 34 applies the pulses to the channel. Simultaneously with the occurrence of a transmitted pulse, digitizing of the voltage of the channel (at 36) and the storing of the sequentially derived echo data values (at 38) are initiated. These sequences are repeated until a total of $N_1$ sweeps in a first run is performed, 40, and then sequences of a second run, shown in FIG. 8, are started.

Figure 7:
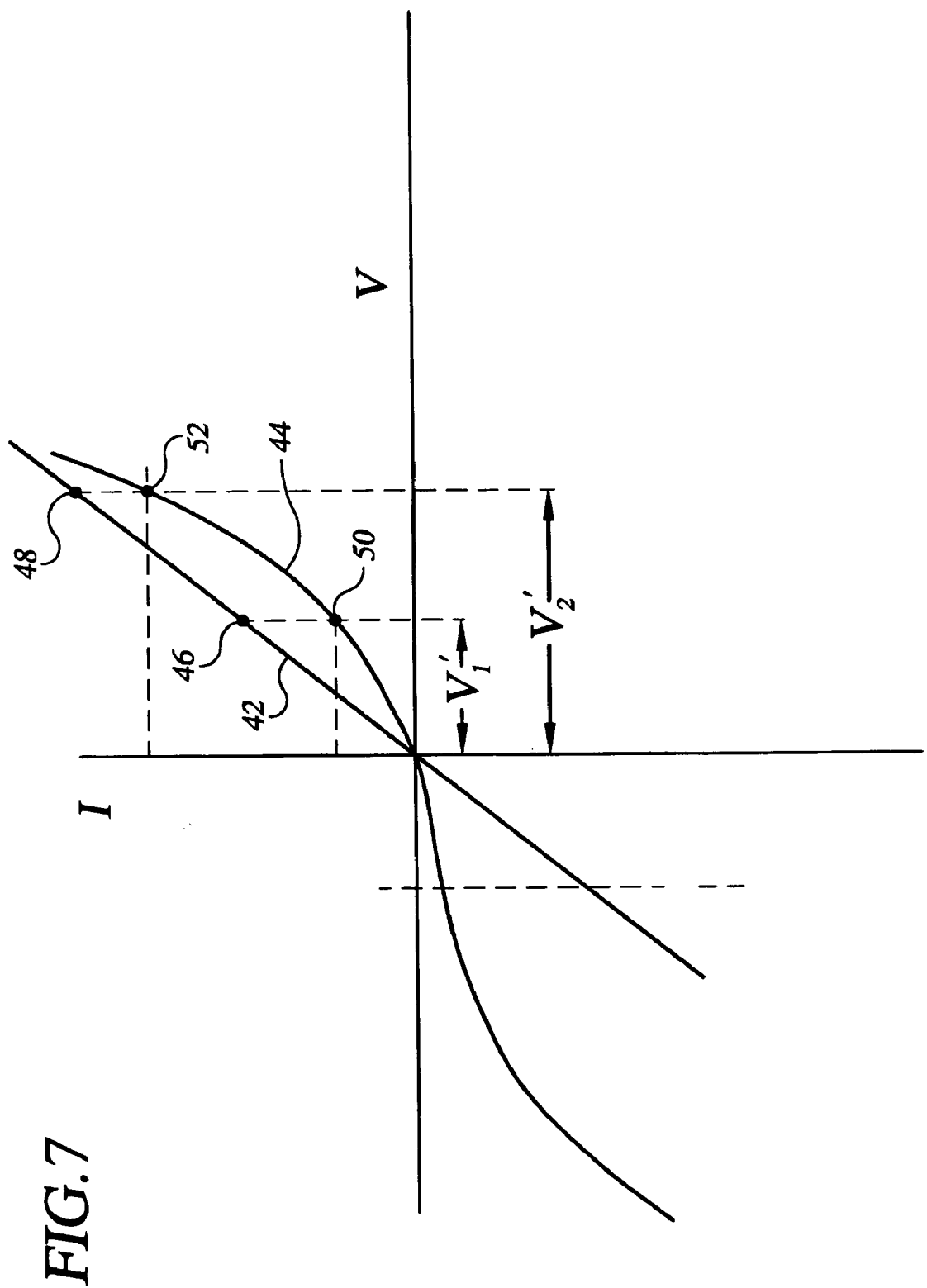
FIG. 7 is a voltage versus drawing useful in understanding the embodiments of the invention illustrated in FIGS. 5, 6, 8, and 9.

Before describing the further acts of the method, it is advantageous to consider the differences in the impedance presented by a linear impairment and by a nonlinear one as echo amplitude is directly related to line impedance at the impairment. Referring to FIG. 7, the voltage, (V) and current (I) relationships are shown for a linear impairment having a linear V vs. I characteristic curve 42 and a nonlinear impairment having a nonlinear V vs. I characteristic curve 44. The small-signal impedance of either impairment is directly proportional to the slope of the relevant curve i.e. 42, 44 at a given voltage. For the linear curve 42, with voltage amplitudes $V_1'$ and $V_2'$ applied, the slopes at points 46, 48 are the same, and hence the impedance at 46, 48 are equal. For the nonlinear curve 44, the slopes for applied voltages $V_1'$ and $V_2'$ at points 50, 52 are different. As a result of this variation of the impedance with voltage, the reflection coefficient for pulses traveling through a nonlinear impairment site will depend on the amplitude of the pulses, while in the linear case the reflection coefficient will remain constant for all pulse amplitudes. It will be noted that the preceding discussion has been simplified by excluding the effects of transmission line impedance and attenuation, which would be needed to obtain the relationship between the voltage V' across the impairment and the pulse amplitude V applied to the line. Nevertheless, the simplification does not affect the result relating to the reflection coefficient.

It will be appreciated that the practice of the invention does not rely on beforehand knowledge of the specific V vs. I characteristics of the nonlinear impairments present in the channel. It is sufficient that the parameters of the channel measurement be controlled and configured such that reflections from a nonlinear impairment occur at different impedances during the different runs of a test. This configuring may be accomplished by varying pulse amplitudes or by various biasing techniques, so that different, selectable portions of the nonlinear V vs. I characteristic are addressable during a run.

Referring to FIG. 8, a second run of $N_2$ sweeps is initiated (at 54) with a pulse amplitude $V_2$ greater than $V_1$. Transmitting a pulse down the line at 56, starting digitizing the line voltage at 58, storing the samples at 60, and stopping the run after $N_2$ sweeps at 62, repeats the sequences of the first run with the greater pulse amplitude, $V_2$. At the conclusion of the run, the acts of FIG. 9 are initiated.

Referring to FIG. 9, the average of the cell data for each corresponding sequential sample of the first run is calculate at 64, by the digital computer 20. Similarly, the average of the cell data for each corresponding sequential sample of the second run is calculated at 66. (It will be appreciated that the above sequences have been set forth for convenience of exposition. In an actual program it may be easier to first accumulate all the data, and then to implement the averaging processes.) The ratio, R, of the amplitudes of $V_2/V_1$ is also computed at 68, and each of the average values of the cells of the first run are multiplied by R at 70. The averages of the first run, after multiplication by R, are subtracted cell by cell, from the corresponding averages of the second run. The differences are sequentially examined for evidence of a residual pulse indicating the presence of one or more impairments in the line. Examination may be visual or may employ a numerical algorithm.

With reference again to FIG. 3, it will be seen that there no echo signal from the linear impairment 16 appears, while an echo signal from the nonlinear impairment 18 is displayed. As described above for a linear impairment, the amplitudes of the echoes from pulses of different amplitudes will be directly proportional to the pulse amplitudes. Hence, the average of the echo amplitudes from linear impairment 16 for applied pulse $V_1$ when multiplied by the ratio of $V_2/V_1$, will equal the average echo amplitudes for applied pulses $V_2$, and the differences between the averages of the first run and the second run will be zero. The same linear analysis applies to the main pulse feed through 12, 12', and these signals do not appear in the display of FIG. 3. However, for a nonlinear impairment, different impedances result from application of voltage pulses of different amplitudes (FIG. 7) and accordingly the amplitudes of echoes for the different pulse amplitudes are not linearly related. After multiplication of the data acquired for the first run by the ratio of $V_2/V_1$, the echo amplitude averages from the first and second runs are not equal, and their differences do not cancel. Hence, a resultant signal is displayed only at the sample positions of nonlinear impairments. It is to be noted that the residual pulse 18' is likely to be smaller in amplitude than 18 of FIG. 2, and could be positive going or negative going depending on the nature of the nonlinearity.

Figure 4:
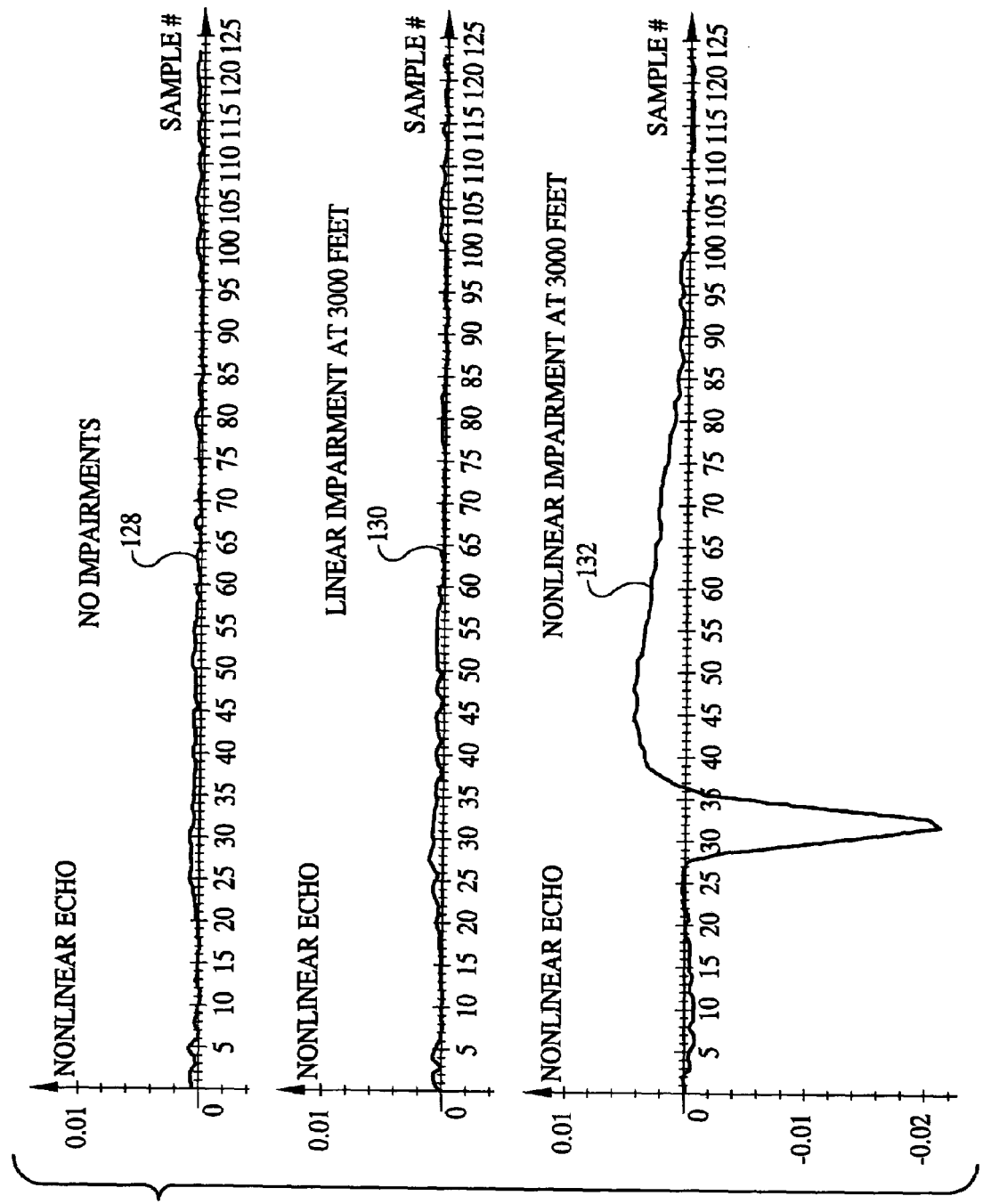
FIG. 4 is a plot generated by the invention from experimental data from a twisted pair transmission line for cases in which there is no impairment in the line, there is a linear impairment at 3000 feet in the line, and there is a nonlinear impairment at 3000 feet in the line.

Once a residual pulse has been identified, the location of the corresponding nonlinear line impairment may be determined. Referring the results displayed in FIG. 4, a residual pulse is apparent in the third trace 132. Estimating the onset of this pulse as occurring at sample 27, for a sample rate of 2.5 million samples per second, the onset occurred at about 10.8 microseconds. Taking the pulse velocity in the line as about 0.6 times the speed of light or about 589 feet per microsecond, we can calculate the round trip distance traveled by the pulse as 589 times 10.8 which equals 6368 feet. This corresponds to a one way distance of 3182 feet, which is in reasonable agreement with the known distance to the nonlinear impairment of 3000 feet. Knowing the distance to the impairment and the amplitude of the residual pulse and the attenuation coefficient for the line should be sufficient information to roughly characterize the severity of the impairment. If more detailed information is desired, the NTDR testing can be repeated at several different pulse amplitudes to further characterize the nonlinear impairment.

With reference again to FIG. 3, it is to be noted that the noise floor 14" is of lower amplitude than the noise floors seen in FIGS. 1 and 2. The noise 14" is derived by averaging the sampled noise measured during the digitizing processes, and because the noise is a random signal the average value when no echo is present tends to zero out.

Figure 10:
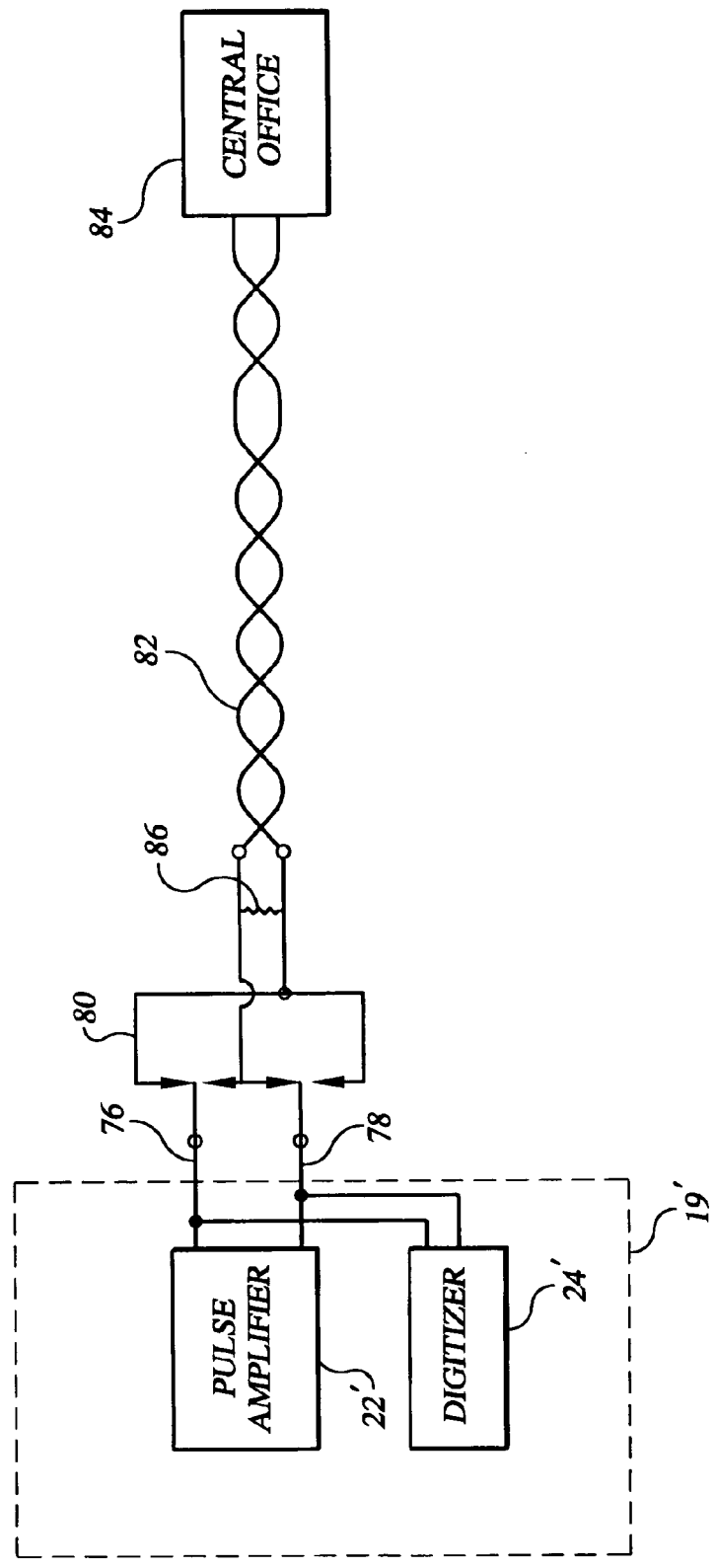
FIG. 10 is a block diagram of an embodiment of the invention where a bias current is applied to the transmission line and an operating point is changed by reversing pulse polarity.
Figure 11:
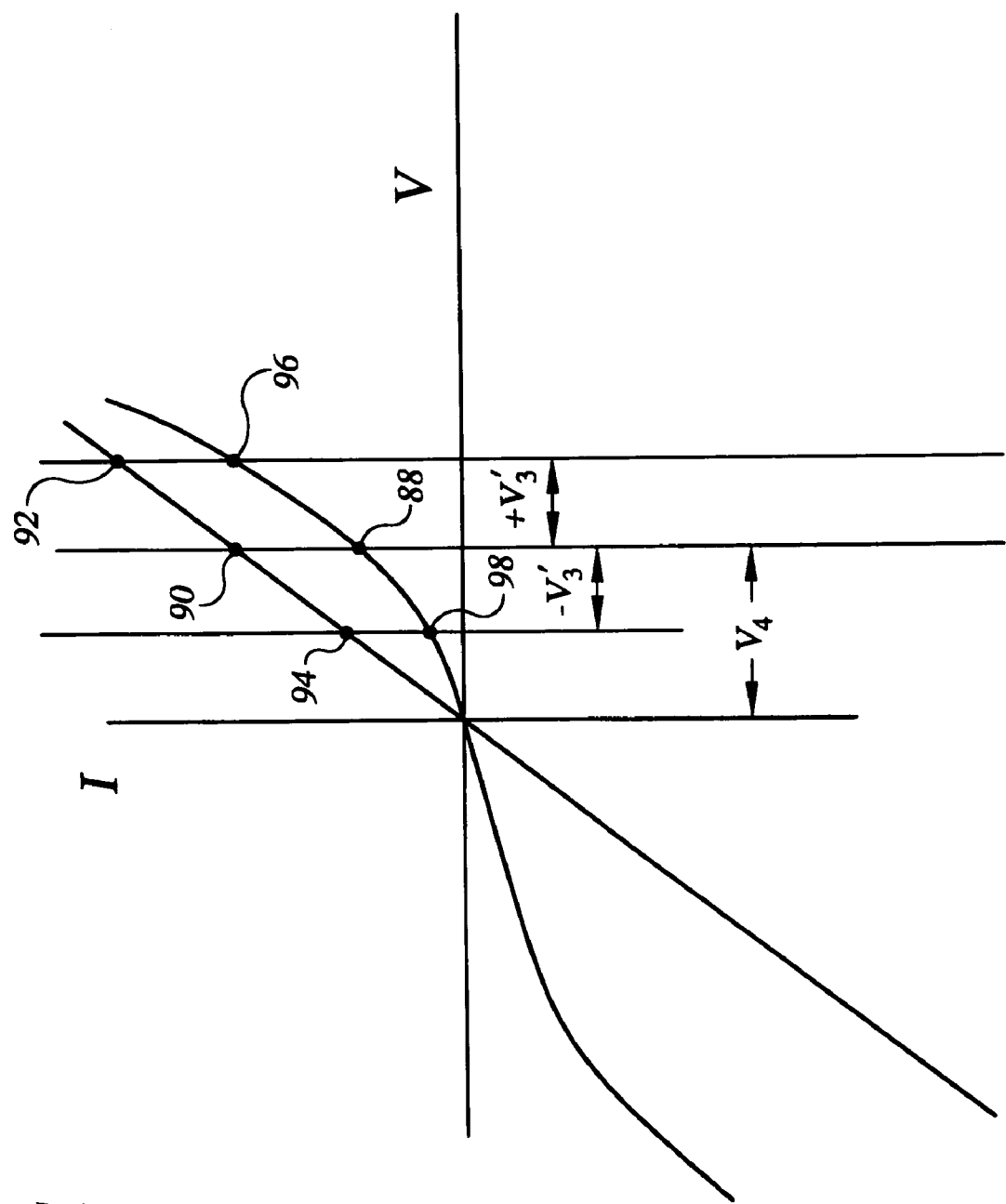
FIG. 11 is a drawing useful in understanding the operation of the embodiment illustrated in FIG. 10, FIGS. 12–14 are flow diagrams illustrating practice of still another embodiment of the invention.

In another embodiment of the invention, shown in FIG. 10, the location of the channel operating point is varied between the two data runs through the use of a bias current. In the transmission lines of a plain old telephone system (POTS) current can be conveniently obtained by using the power supplied to the line by the telephone company. However the current could also be supplied by other means if necessary. As a first example of this embodiment, a test apparatus indicated by reference number 19' comprises the same components as the apparatus 19 of FIG. 5, with the two wire outputs 76, 78 from a pulse amplifier 22' explicitly shown. A reversing switch 80 is connected between the pulse amplifier 72' and an active POTS telephone line 82 under test. The digitizer 24' is connected to one side of the telephone line 82. The telephone company central office 84 applies a dc voltage between the two conductors of the telephone line 82, and this voltage can be used to generate a bias current in the line. A resistor 86 or other conducting element at the test apparatus 19' is placed across the line 82 during the test to provide a current path, thereby generating the bias across the line impairments. FIG. 11 shows the V vs. I characteristics for linear and nonlinear impairments with bias. The resulting dc bias voltage $V_4$ shifts the quiescent operating points, (i.e. the points about which the pulse signals are applied), of a linear impairment to point 90 and to point 88 for a nonlinear impairment. The impedances for positive applied equal amplitude pulses are the slopes of the V vs. I characteristics at 92 for linear impairments, and at 96 for a nonlinear one. The impedances for negative applied equal amplitude pulses are the slopes at 94 f or linear impairments and 98 for nonlinear ones. As before, the lack of any change in impedance for the linear case means that there will be no change in the reflection coefficient, while the changing impedance in the nonlinear case will typically result in a change in the reflection coefficient.

Figure 12:
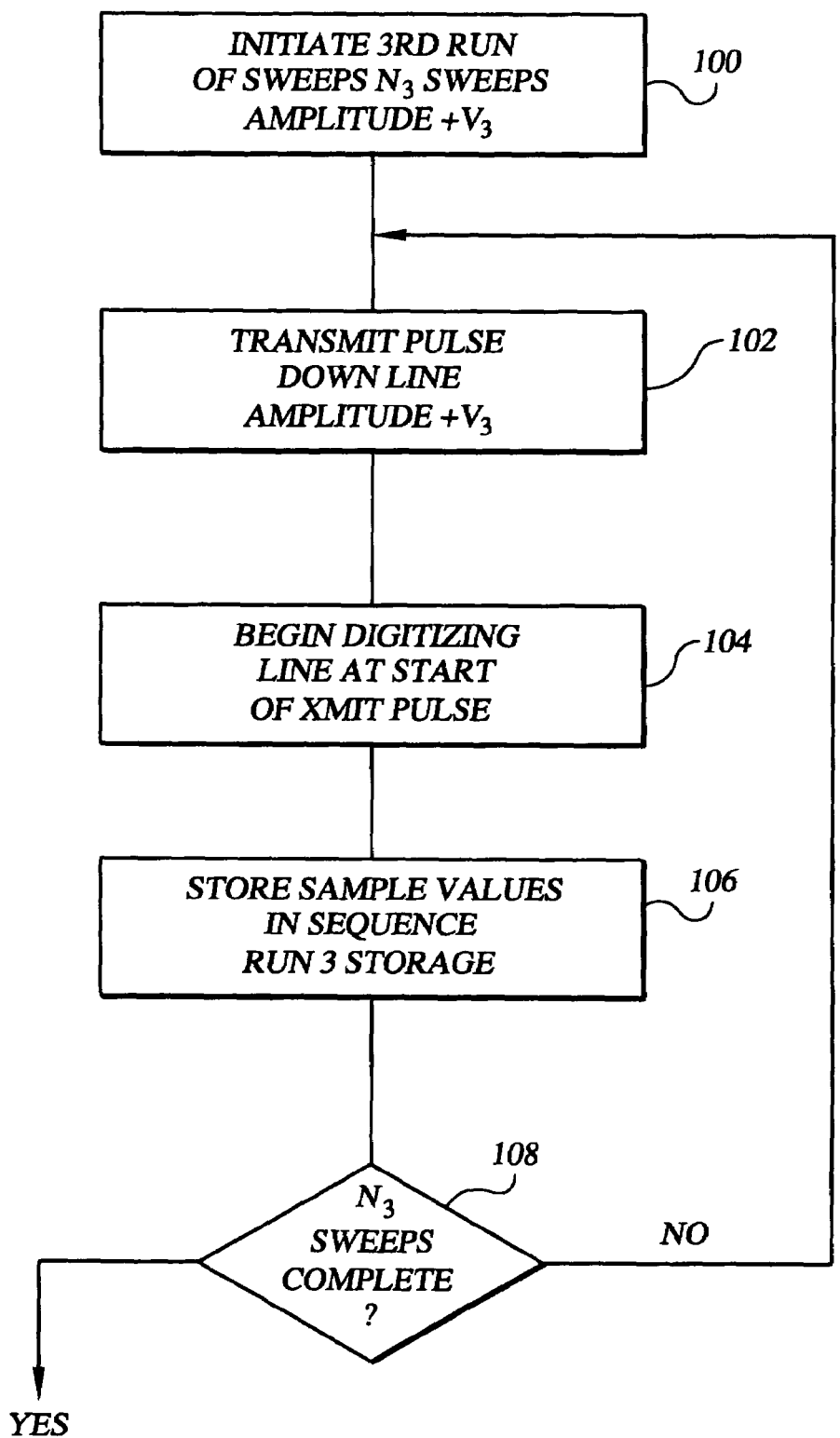
Figure 13:
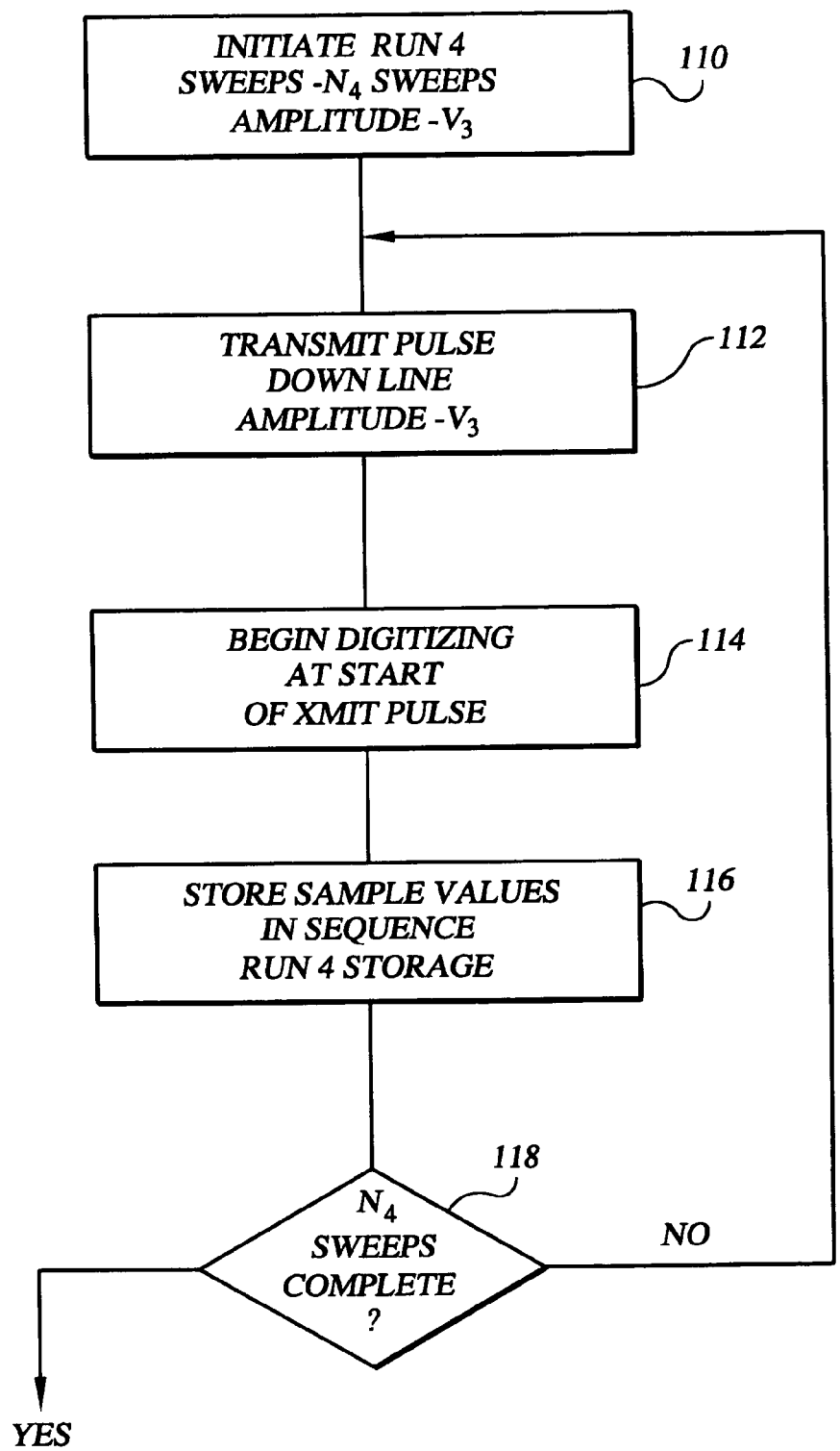
Figure 14:
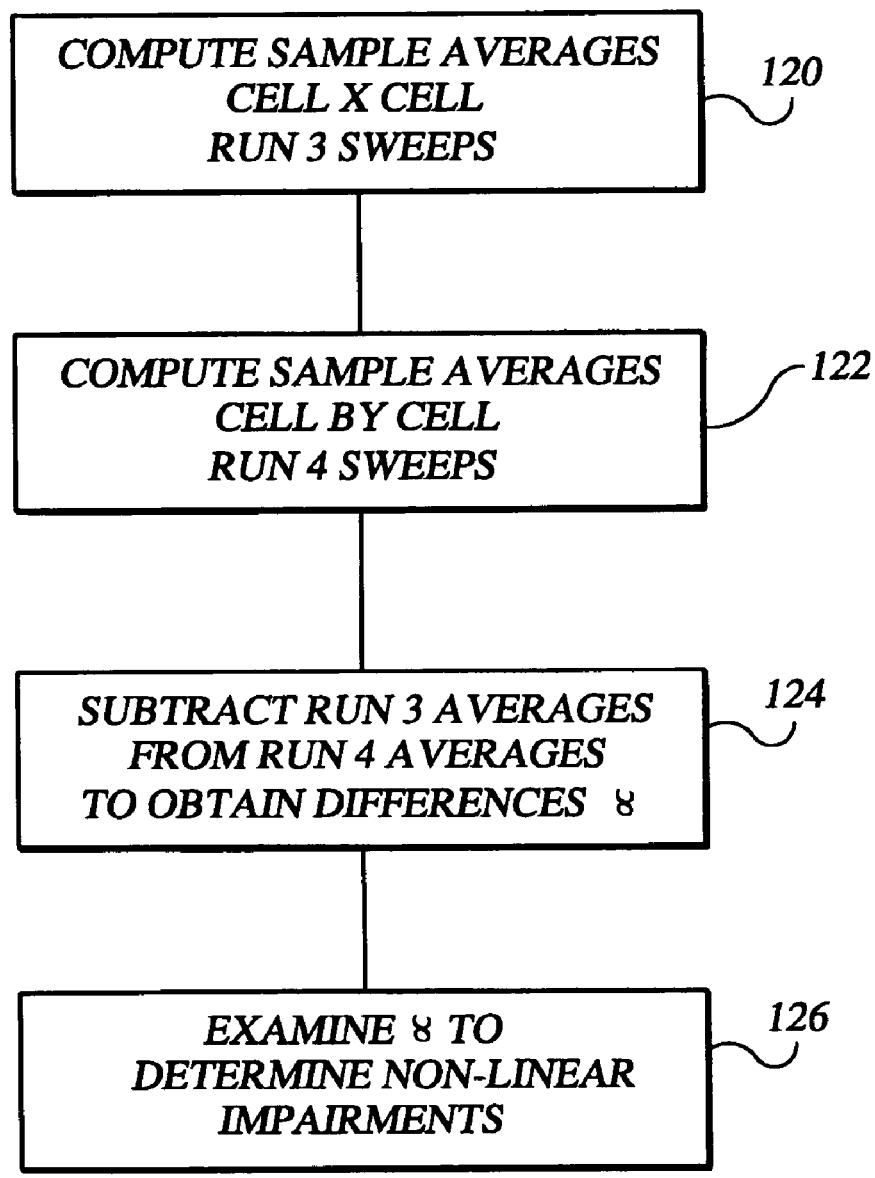

A third run (so identified to differentiate it from the first and second runs of the previously disclosed embodiment), is performed with the switch 80 in the position shown in FIG. 10, and includes the acts of FIGS. 12–14. The third run is initiated at 100 with positive pulses having a magnitude $+V_3$ applied to biased line 82. These pulses are transmitted 102 down the line, the line voltages are digitized 104, and the sample values stored 106 in run 3 storage. The number of sweeps performed is tested at 108, and the method continues until a preset number $N_3$ of sweeps occurs at 108. When $N_3$ sweeps are finished the reversal switch 80 is operated, and its transfer contacts reverse the polarity, of the pulse applied to the line 82 from $+V_3$ to $-V_3$ without changing the absolute amplitude of the pulse. A fourth run is initiated at 110 with pulses transmitted down the line 112, the line voltage is digitized at 114, sample values stored at 116, and a test is performed at 118 to determine if the fourth run is completed. Upon completion, averages are computed for cell values of the third and fourth runs at 120 and 122, the average values for the third and fourth runs are subtracted at 124 on a cell by cell basis, and the differences examined as a function of sample number to show the nonlinear impairments, as illustrated in FIG. 3.

Figure 15:
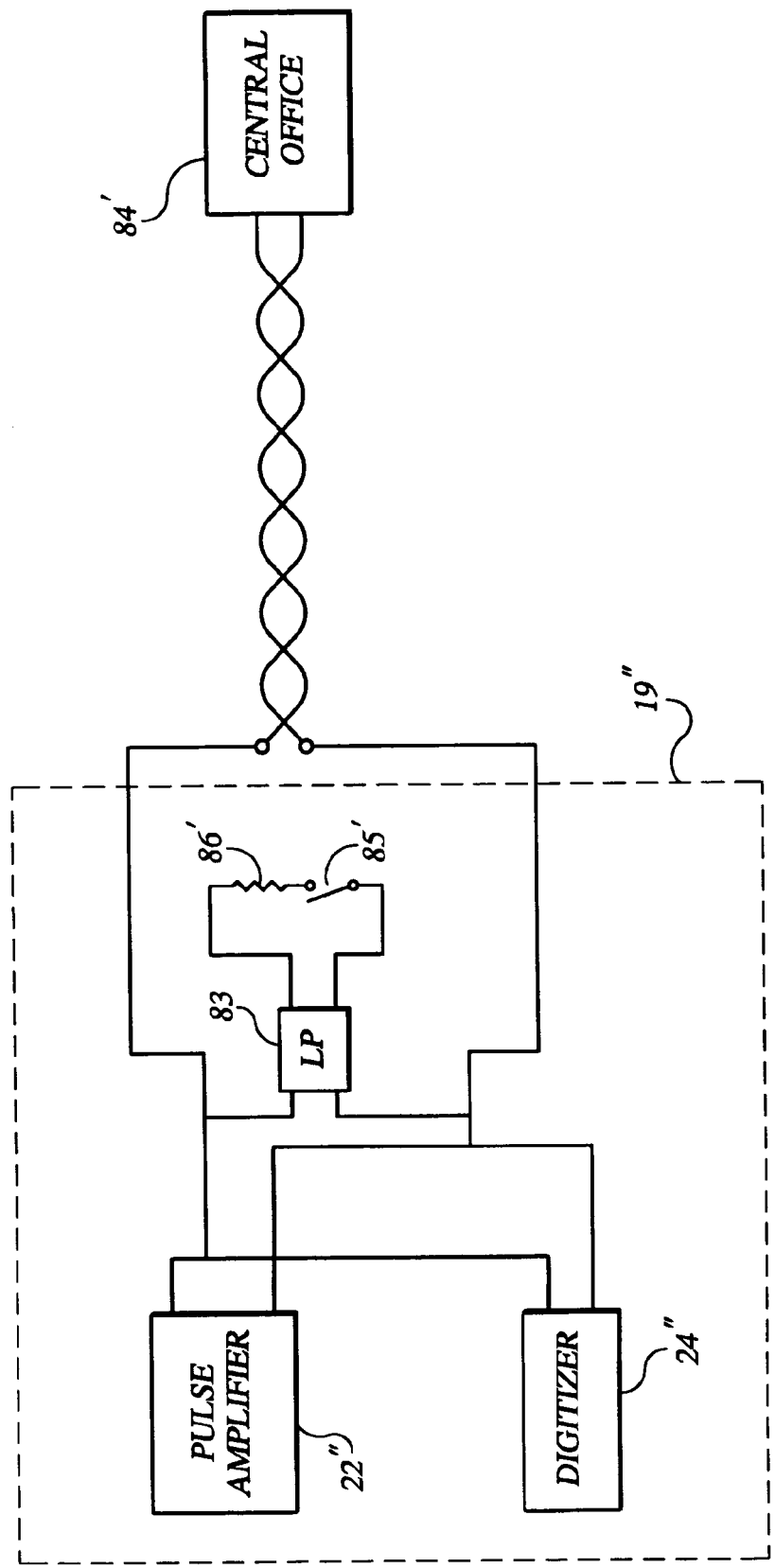
FIG. 15 is a block diagram of an embodiment of the invention wherein an point is changed by turning a bias current to a transmission line on or off.

It will be noted that additional versions of the embodiment of FIGS. 12–14 are possible in the practice of the invention. Pulses of equal amplitudes and the same polarity may be used, and it will be appreciated that the combination of equal amplitude, same polarity pulses functions equally well as long as the nonlinear impedances result in pulse echoes from the two runs that are distinguishable from the echoes reflected from the linear impairments. This may be accomplished by making a first reflectometry measurement without any bias current in the line, and then making a second measurement with the line biased. FIG. 15 illustrates an example, wherein for both runs the pulse amplitude and polarity remain the same.

In FIG. 15, still another embodiment of the invention is shown. In FIG. 15, the test apparatus denoted by reference number 19" comprises the same components as the test apparatus 19 of FIG. 5, albeit for clarity only the pulse amplifier 22" and digitizer 24" are shown. The bias current is activated by the closure of switch 85' connected to a low pass filter 83. This filter will allow the passage of the dc bias current, but will block the passage of pulses, thus preventing any change in the loading of the pulses when the switch 85' is closed. In some cases the load resistor 86' may be replaced by a short circuit to maximize the bias current. The low pass filter 83 may be implemented as a series inductor. When the switch 85' is closed, the resultant current biases the impairments as previously described, and a reflectometry run generates data resulting from the biased values of the impairment impedances in the line. With the switch 85' open, a second run provides different echo responses from the nonlinear impairments, since the nonlinearities' impedances depend on the bias point, while the impedances, and correspondingly the echoes, exhibited by the linear impairments are unchanged. The data from the runs are processed as previously described, and the nonlinearities are displayed and identified.

The invention has been described in detail with particular reference to a number of embodiments thereof, but it will be appreciated that variations and modifications can be effected within the spirit and scope of the invention. It may also be that the invention has application to other fields besides that of the communications channels discussed in detail above.

I claim:

1. A method of determining the presence or absence of one or more nonlinear impairments in a linear medium, comprising:
    setting one or more pulse transmission parameter values;
    applying a first sequence of one or more first transmit pulses to the medium for transmission through the medium under the one or more pulse transmission parameter values;
    receiving from the medium a first sequence of one or more echo signals reflected from impairments in the medium in response to the first sequence of transmit pulses;
    digitizing the echo signals for each transmit pulse of the first sequence of first transmit pulses to produce a set of digital values for each transmit pulse of the first sequence of first transmit pulses;
    averaging the digital values for corresponding echo signals of the first sequence of echo signals to produce a first digitized set representing the average of the first sequence of echo signals;
    changing the one or more pulse transmission parameter values;
    applying a second sequence of one or more second transmit pulses to the medium for transmission through the medium under the one or more changed pulse transmission parameter values;
    receiving from the medium a second sequence of one or more echo signals reflected from impairments in the medium in response to the second sequence of transmit pulses;
    digitizing the echo signals for each transmit pulse of the second sequence of second transmit pulses to produce a set of digital values for each transmit pulse of the second sequence of second transmit pulses;
    averaging the digital values for corresponding echo signals of the second sequence of echo signals to produce a second digitized set representing the average of the second sequence of echo signals;
    combining the first and the second digitized sets to produce a residual digitized set; and
    examining the residual digitized set for a residual pulse indicating the presence of one or more nonlinear impairments.

2. The method of claim 1 wherein combining includes:
    choosing a scale factor S that is allowed to be equal to 1 or any other real number; and
    multiplying each digital value of the first digitized set by S and subtracting each product from the corresponding digital value of the second digitized set to produce the corresponding digital value of the residual digitized set.

3. The method of claim 2 wherein the at least one pulse transmission parameter is selected from the group including an operating point at which the first and second transmit pulses are applied to the medium, a polarity at which the first and second transmit pulses are applied to the medium, and an amplitude at which the first and second transmit pulses are applied to the medium.

4. The method of claim 2 wherein the medium is a medium in the set consisting of a twisted pair transmission line and a coaxial transmission line.

5. The method of claim 2 wherein S is the ratio of the amplitude of the second pulses to the amplitude of the first pulses.

6. The method of claim 2 wherein the at least one pulse transmission parameter is an electrical bias establishing an operating point at which the first and second transmit pulses are applied to the medium.

7. The method of claim 6 whereby the electrical bias is applied by applying a dc current to the medium.

8. The method of claim 6 whereby the electrical bias is applied by applying a dc voltage across the medium.

9. The method of claim 8 whereby applying a dc voltage includes applying a voltage across a telephone channel from a telephone company central station.

10. The method of claim 9 further including placing a conducting element to the channel at a customer end to cause a dc current to be applied to the channel.

11. A method for differentiating at least one nonlinear impairment from any linear impairments present in an electrically conductive line, the method comprising:
    performing a first measurement on the line by a time domain reflectometry apparatus to detect the presence of at least one nonlinear impairment in the line;
    receiving a first data sequence in the first measurement, the first data sequence including echo signals reflected from impairments in the line, in which first echo signals reflected from at least one nonlinear impairment are not distinguishable from first echo signals reflected from any linear impairment in the line;
    storing the first data sequence obtained in the first measurement;
    altering the impedance of at least one nonlinear impairment in the line without altering the impedance of any linear impairment in the line;
    performing a second measurement by the time domain reflectometry apparatus on the line;
    receiving a second data sequence in the second measurement, the second data sequence including second echo signals reflected from the impairments in the line, in which second echo signals reflected from the at least one nonlinear impairment in the line have characteristics which are distinguishable from corresponding characteristics of second echo signals reflected from the any linear impairment in the line, the characteristics resulting from altering the impedance;

storing the second data sequence obtained in the second measurement; and combining the first data sequence and the second data sequence to distinguish echo signals reflected from the at least one nonlinear impairment in the line from any linear impairment in the line based on the characteristics.

12. The method of claim 11, each of the first and second measurements including coupling test pulses from the time domain reflectometry apparatus to the line, wherein the combining includes determining the ratio of the amplitudes of the test pulses in the first and second measurements, multiplying the amplitude of each of the echo signals of the second data sequence by the ratio, and, sequentially subtracting the amplitudes of the echo signals of the first data sequence from the corresponding amplitudes resulting from the multiplying in order to mutually cancel amplitudes of echo signals from any linear impairment in the line while leaving a non-cancelled amplitude identifying the at least one nonlinear impairment in the line.

13. The method of claim 12 whereby altering the nonlinear impedance includes controlling an operating point of the at least one nonlinear impairment about which the time domain reflectometry apparatus performs the first and second measurements.

14. The method of claim 13 whereby controlling the operating point of the nonlinear impairment includes electrically biasing the at least one nonlinear impedance.

15. The method of claim 14 whereby electrically biasing includes applying dc current to the line.

16. The method of claim 15 whereby applying a dc current to the line includes applying a dc voltage across the line.

17. The method of claim 16 whereby applying a dc voltage includes applying a dc voltage across a telephone line from a central telephone station.

18. The method of claim 16 whereby applying a dc voltage includes placing a resistor across the line at the central telephone station.

19. The method of claim 12 whereby controlling the operating point of the nonlinear impedance includes reversing the polarity of pulses provided by the time domain reflectometry apparatus between the first and the second measurements.

20. A time domain reflectometry apparatus, comprising:

a pulse amplifier with an output for producing sequences of transmit pulses for application to an electrically conductive line;

a switch circuit connected to the pulse amplifier output for controlling transmission parameters of the transmit pulses applied to the line;

a digitizer with an input for receiving echo signals reflected from impairments in the line in response to the sequences of transmit pulses;

storage connected to the digitizer for storing sets of digitized echo signals, a first set including at least one digitized echo signal representing an echo signal reflected from an impairment in the line in response to a first sequence of transmit pulses applied to the line under first transmission parameters and a second set including at least one digitized echo signal representing an echo signal reflected from an impairment in the line in response to a second sequence of transmit pulses applied to the line under second transmission parameters; and an arithmetic unit connected to the storage for:

averaging amplitudes of the signals in the first set of digitized echo signals and magnitudes of the signals of the second set of digitized echo signals;

combining the average amplitudes of the signals of the first set of digitized echo signals with the average amplitudes of corresponding signals of the second set of digitized echo signals; and distinguishing at least one nonlinear impairment in the line based upon the combination.

21. The apparatus of claim 20 wherein the arithmetic unit includes means for computing a first ratio of amplitudes of the transmit pulses in the first and second sequences, computing second ratios of the amplitudes of corresponding digitized echo signals in the first and the second sets of digitized echo signals, and distinguishing the at least one nonlinear impairment when the first ratio is not equal to one of the second ratios.

22. The apparatus of claim 21 wherein the switch includes means for controlling an operating point at which the sequences of transmit pulses are applied to the line.

23. The apparatus of claim 22 wherein the means for controlling the operating point includes means for electrically biasing the line.

24. The apparatus of claim 23 wherein the means for electrically biasing includes means for applying a dc current in the line.

25. The apparatus of claim 23 wherein the means for electrically biasing includes means for applying a dc voltage across the line.

26. The apparatus of claim 25 wherein the line is a telephone line, the voltage applied from a telephone central station.

27. The apparatus of claim 26 the means for electrically biasing including a conducting element placed across the line during at least one of the sequences.

28. The apparatus of claim 22 wherein the switch includes means for reversing the polarity of the transmit pulses.

29. An apparatus for differentiating at least one nonlinear impairment from any linear impairments present in an electrically conductive line, the apparatus comprising:

a time domain reflectometry apparatus for performing a first measurement and a second measurement on the line to detect the presence of the at least one nonlinear impairment in the line;

a switch connected to the time domain reflectometry apparatus for altering the impedance of the at least one nonlinear impairment after the first measurement without altering the impedance of the any linear impairments;

storage for sequentially storing a first data sequence in the first measurement and a second data sequence in the second measurement, the first data sequence including echo signals reflected from impairments in the line, in which first echo signals reflected from at least one nonlinear impairment are not distinguishable from first echo signals reflected from any linear impairment in the line, the second data sequence including second echo signals reflected from the impairments in the line, in which second echo signals reflected from the at least one nonlinear impairment in the line have characteristics which are distinguishable from corresponding characteristics of second echo signals reflected from the any linear impairment in the line, the characteristics resulting from altering the impedance; and a processor connected to the storage for combining the first data sequence and the second data sequence to distinguish echo signals reflected from the at least one nonlinear impairment in the line from any linear impairment in the line based on the characteristics.

30. The apparatus of claim 29 wherein each of the first and second measurements including coupling test pulses from the time domain reflectometry apparatus to the line, wherein the arithmetic unit includes means for determining the ratio of the amplitudes of the test pulses in the first and second measurements, multiplying the amplitude of each of the echo signals of the second data sequence by the ratio, and sequentially subtracting the amplitudes of the echo signals of the first data sequence from the corresponding amplitudes resulting from the multiplying in order to mutually cancel amplitudes of echo signals from any linear impairment in the line while leaving a non-cancelled amplitude identifying the at least one nonlinear impairment in the line.

31. The apparatus of claim 30 wherein the switch includes means for controlling the operating point of the nonlinear impairments about which the time domain reflectometry apparatus performs the measurement.

32. The apparatus of claim 31 wherein the means for controlling the operating point includes means for electrically biasing the line.

33. The apparatus of claim 32 wherein the means for electrically biasing includes means for applying dc current to the line.

34. The apparatus of claim 33 wherein the means for applying dc current to the line includes means for applying a voltage across the line.

35. The apparatus of claim 34 wherein the line is a telephone line and the means for applying the voltage is in a central telephone station.

36. The apparatus of claim 34 wherein the means for applying a voltage across the line includes a conducting element placed across the line.

37. The method of claim 31 whereby the means for controlling the operating point includes means for reversing the polarity of pulses provided by the time domain reflectometry apparatus between the first and the second measurements.

38. A method of determining the presence or absence of one or more nonlinear impairments in a linear medium, comprising:

setting one or more pulse transmission parameter values;

applying a first sequence of one or more first transmit pulses to the medium for transmission through the medium under the one or more pulse transmission parameter values;

receiving from the medium a first sequence of one or more echo signals reflected from impairments in the medium in response to the first sequence of transmit pulses;

digitizing the echo signals for each transmit pulse of the first sequence of first transmit pulses to produce a set of digital values for each transmit pulse of the first sequence of first transmit pulses;

averaging the digital values for corresponding echo signals of the first sequence of echo signals to produce a first digitized set representing the average of the first sequence of echo signals;

changing the one or more pulse transmission parameter values;

applying a second sequence of one or more second transmit pulses to the medium for transmission through the medium under the one or more changed pulse transmission parameter values;

receiving from the medium a second sequence of one or more echo signals reflected from impairments in the medium in response to the second sequence of transmit pulses;

digitizing the echo signals for each transmit pulse of the second sequence of second transmit pulses to produce a set of digital values for each transmit pulse of the second sequence of second transmit pulses;

averaging the digital values for corresponding echo signals of the second sequence of echo signals to produce a second digitized set representing the average of the second sequence of echo signals;

combining the first and the second digitized sets to produce a residual digitized set; and determining the distance to at least one of the one or more nonlinear impairments based upon the location of displacements in the residual digitized set.

* * * * *